United States Patent [19]

Vacanti

[11] Patent Number: 4,670,753
[45] Date of Patent: Jun. 2, 1987

[54] METHOD AND APPARATUS FOR MINIMUM AMPLITUDE TIME HISTORY ANALYSIS

[75] Inventor: David C. Vacanti, Renton, Wash.

[73] Assignee: The Boeing Company, Seattle, Wash.

[21] Appl. No.: 656,489

[22] Filed: Oct. 1, 1984

[51] Int. Cl.$^4$ ............................................. G01S 13/04
[52] U.S. Cl. ..................................... 342/90; 342/109; 342/188; 342/195; 342/196
[58] Field of Search ............... 343/5 CF, 5 FT, 5 SA, 343/7 A, 5 DP, 17.1 R, 361–366; 364/516, 517; 244/3.19; 342/90.27, 189, 195, 192

[56] References Cited

U.S. PATENT DOCUMENTS

| | | | |
|---|---|---|---|
| 3,234,547 | 2/1966 | Katzin | 343/13 |
| 3,353,177 | 11/1967 | Wilmot | 343/5 DP |
| 3,412,397 | 11/1968 | Evans | 343/5 DP |
| 3,483,559 | 12/1969 | Korzekwa et al. | 343/361 X |
| 3,566,403 | 2/1971 | Hills | 343/361 X |
| 3,689,924 | 9/1972 | Caruso, Jr. | 343/362 X |
| 3,716,856 | 2/1973 | Beguin | 343/6.8 LL |
| 3,718,927 | 2/1973 | Howard et al. | 343/7.4 |
| 3,772,689 | 11/1973 | Root, Jr. | 343/5 SA |
| 3,797,014 | 3/1974 | Tompkins et al. | 343/5 DP |
| 3,806,929 | 4/1974 | Moore | 343/5 SA |
| 3,819,920 | 6/1974 | Goldfischer | 343/9 X |
| 3,849,780 | 11/1974 | Dynan | 343/7 A |
| 3,849,781 | 11/1974 | Ort | 343/18 E |
| 3,918,055 | 11/1975 | Shimizu et al. | 343/5 R |
| 4,005,414 | 1/1977 | Goggins, Jr. | 343/5 SA |
| 4,008,472 | 2/1977 | Nirasawa et al. | 343/7 A |
| 4,035,797 | 7/1977 | Nagy | 343/55 A |
| 4,053,882 | 10/1977 | Van Etten | 343/5 SA |
| 4,075,630 | 2/1978 | Shapiro et al. | 343/5 FT X |
| 4,104,633 | 8/1978 | Donahue et al. | 343/5 CF X |
| 4,106,014 | 8/1978 | Dunn | 343/5 SA |
| 4,106,015 | 8/1978 | Beguin et al. | 343/5 W |
| 4,107,678 | 8/1978 | Powell | 343/7 ED |
| 4,231,037 | 10/1980 | Long | 343/5 CE |
| 4,323,898 | 4/1982 | Barnes et al. | 343/55 A |
| 4,323,899 | 4/1982 | Barnes et al. | 343/55 A |
| 4,329,687 | 5/1982 | Kloevenkorn et al. | 343/13 R |
| 4,336,542 | 6/1982 | Bielli et al. | 343/362 X |

OTHER PUBLICATIONS

Barrick, "FM/CW Radar Signals in Digital Processing," NOAA Technical Report ERL 283–WPL26 (Jul. 1973).

Primary Examiner—T. H. Tubbesing
Assistant Examiner—Gilberto Barrón, Jr.
Attorney, Agent, or Firm—Finnegan, Henderson, Farabow, Garrett and Dunner

[57] ABSTRACT

A method and apparatus selects the minimum value of a sequence of power measurements taken from each range of a radar's target area. This is preferably performed for two channels of a radar, and the minimum values of both channels for each range are compared to determine the likelihood of a target in each range. Once such likelihood is established, then further processing takes place with regard to ranges with high likelihoods of having targets. The determined minimum value for each range may also be used to normalize each range's power measurements, while preserving phase information, for moving target detection.

26 Claims, 9 Drawing Figures

METHOD AND APPARATUS FOR MINIMUM AMPLITUDE TIME HISTORY ANALYSIS

FIELD OF THE INVENTION

This invention relates to the field of radar signal processing and, in particular, to radar signal processing to improve signal-to-noise and signal-to-clutter ratios.

BACKGROUND OF THE INVENTION

Detection of targets by radars, especially by airborne radars, is very difficult because the vegetative "clutter" which surrounds the targets can mask targets or cause the radar to misidentify targets. "Clutter" is generally described as radar reflections from natural objects, like vegetation. Clutter is different from noise, although both interfere with target detection. Noise generally refers to a random distribution of unwanted thermal energy.

Target detection is particularly difficult for radars operating at millimeter wavelengths. Such radars, which are often used in tactical missiles, attempt to locate targets which are hidden by heavy vegetative clutter. To improve target detection, many millimeter radars contain moving target indicators. If the targets are not moving, however, they may easily avoid detection.

Conventional radar signal processors cannot selectively reduce noise and clutter signals to enhance a radar's ability to detect both fixed and moving targets. The most common radar system for target detection employs a coherent radar which integrates several radar returns from a single antenna beam position. The integration results in the coherent addition of returns from targets and the reduction of noise energy. Much of the radar energy reflected from vegetative clutter, however, is not canceled by the integration process. Thus, while this method may improve the signal to noise ratio, it does not improve the signal-to-clutter ratio significantly. Furthermore, since the process of coherent integration on a moving platform requires motion compensation, systems which use this method are difficult to implement.

Another approach to the problem of target detection employs Doppler Beam Sharpening (DBS). DBS systems take advantage of the fact that slightly different doppler frequencies occur across the antenna beamwidth of a moving radar. Beam sharpening occurs by selecting only a portion of these doppler frequencies for analysis, since the signals used come from only a narrow portion of the antenna azimuth extent. When the azimuth extent of the beam is reduced, the amount of energy due to clutter is also reduced. The practical realization of a DBS system is very complex, since it depends on missile velocity and requires a sideways look angle. Thus, DBS systems can be adversely affected by changes in missile velocity, and the use of DBS systems may limit missile maneuverability.

Other techniques used for radar signal processing include two- and three-pulse clutter cancelers and moving target indicators. These techniques are undesirable since they require a coherent radar, rely on target motion, and are sensitive to changes in target velocity. Furthermore, such systems are not sensitive to very low target velocities of only a fraction of a meter per second and cannot detect fixed targets surrounded by vegetation.

An object of the present invention therefore is a radar signal processor with very fast and accurate target detection and classification.

Another object of this invention is a fast and accurate radar signal processor which can be used in a missile without being significantly affected by missile velocity.

A further object of the present invention is a radar signal processor which can detect both stationary and moving targets.

Additional objects and advantages of the invetion will be set forth in the description which follows or may be learned by practice of the invention.

SUMMARY OF THE INVENTION

The methods and apparatus of this invention achieve these objects and overcome the problems of conventional radar systems by selecting the minimum value of a sequence of power measurements taken from each range of a radar's target area. This invention takes advantage of the fact that successive power measurements from ranges containing targets will vary much less than those from ranges with only clutter or noise. Thus, large minimum values for ranges indicate a likelihood of finding targets in those ranges. In addition, by using measurements from a dual polarized radar and comparing for each range the minimum values from both channels, the accuracy of target detection increases.

Further radar processing, for example, target classification and doppler processing to determine target velocity, need only take place for ranges in which there is sufficient "minimum power" to indicate a high probability of finding a target in those ranges.

To achieve the objects, and in accordance with the purpose of the invention as embodied and broadly described herein, the signal processor of this invention for a radar viewing a target area comprises: means for measuring the radar power received from a plurality of ranges in the target area and for producing on first and second channels signals which represent successive measurements of the power from the ranges; means coupled to the measuring means for determining for each range the minimum of a first number of successive power measurements in each channel; and means for correlating the determined minimum power measurements in the first and second channels for each range in order to locate targets in the target area.

To achieve the objects, and in accordance with the purpose of the invention as embodied and broadly described herein, the signal processing method of this invention comprises the steps of: measuring the power received from different ranges in a target area for a radar; producing on first and second channels signals from the measured power, the signals representing successive power measurements for the ranges; determining for each of the channels the minimum of a first number of successive power measurements for each range in the target area; and correlating the determined minimum power measurements in the first and second channels for each range in order to locate targets in the target area.

The accompanying drawings which are incorporated in and constitute a part of this specification, illustrate an embodiment of the invention and, together with the description of that embodiment, explain the principles of the invention.

BRIEF DESCRIPTION OF THE DRAWINGS

The preferred embodiment of FIG. 6 is a diagram of the correlator shown in FIG. 1.

DESCRIPTION OF THE PREFERRED EMBODIMENT

Reference will now be made to a presently preferred embodiment of the invention, an example of which is illustrated in the accompanying drawings.

The radar signal processor of the present invention includes means for measuring the radar power received from different ranges in a radar's target area and for producing on first and second channels signals which represent successive power measurements from the ranges. Preferably, such measuring means include means for transmitting radar power to the target area, for receiving reflections of the transmitted power from the target area, and for producing on first and second channels signals representing the signal power of the reflections.

Figure 1:
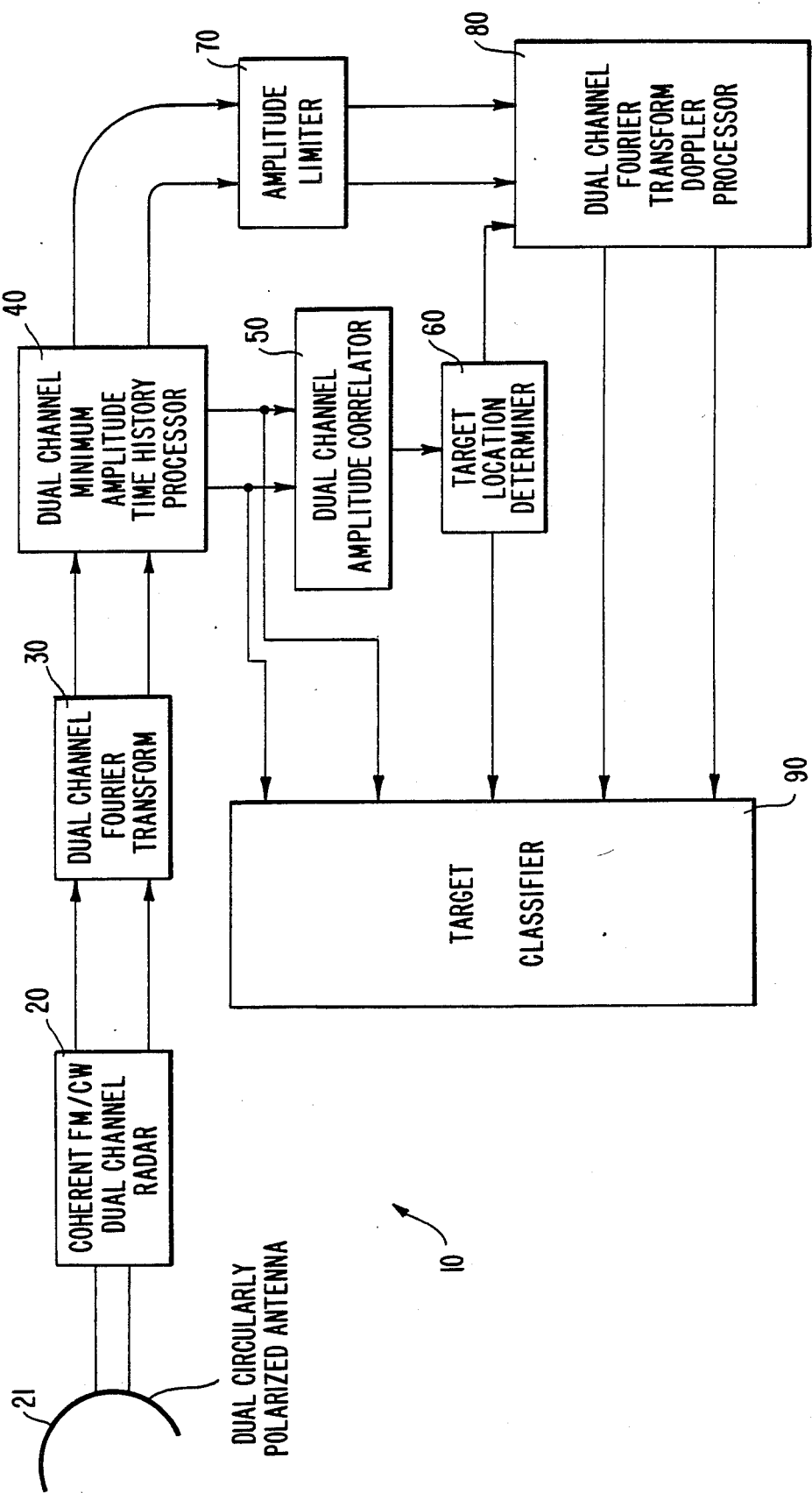
FIG. 1 shows the preferred embodiment of a radar signal processor constructed in accordance with the teachings of this invention.
Figure 2:
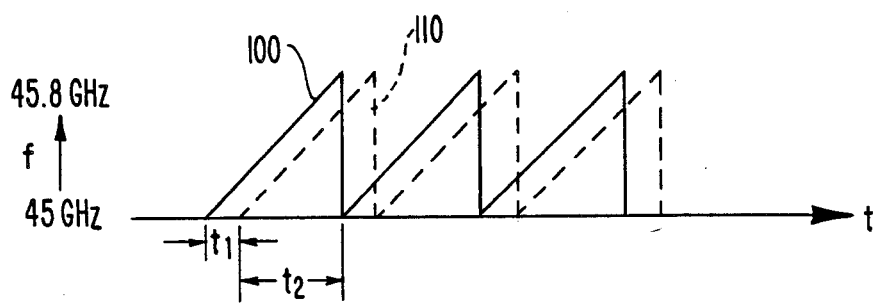
FIG. 2 shows a representation of the transmitted and received signals for the FM/CW radar shown in the preferred embodiment of FIG. 1.

In FIG. 1, which shows an embodiment of a radar signal processor 10 according to the present invention, Coherent FM/CW Dual Channel Radar 20 can be considered as part of the transmitting, receiving and signal producing means of the present invention. Radar 20 is a conventional dual channel radar which contains circuitry to generate an FM/CW signal. FIG. 2 shows an example of a transmitted FM/CW signal. The transmitted signal 100 regularly sweeps a predetermined frequency range between 45 and 45.8 GHz. In the preferred embodiment of the present invention, the transmitted FM signal is also circularly polarized in one direction.

Figure 3:
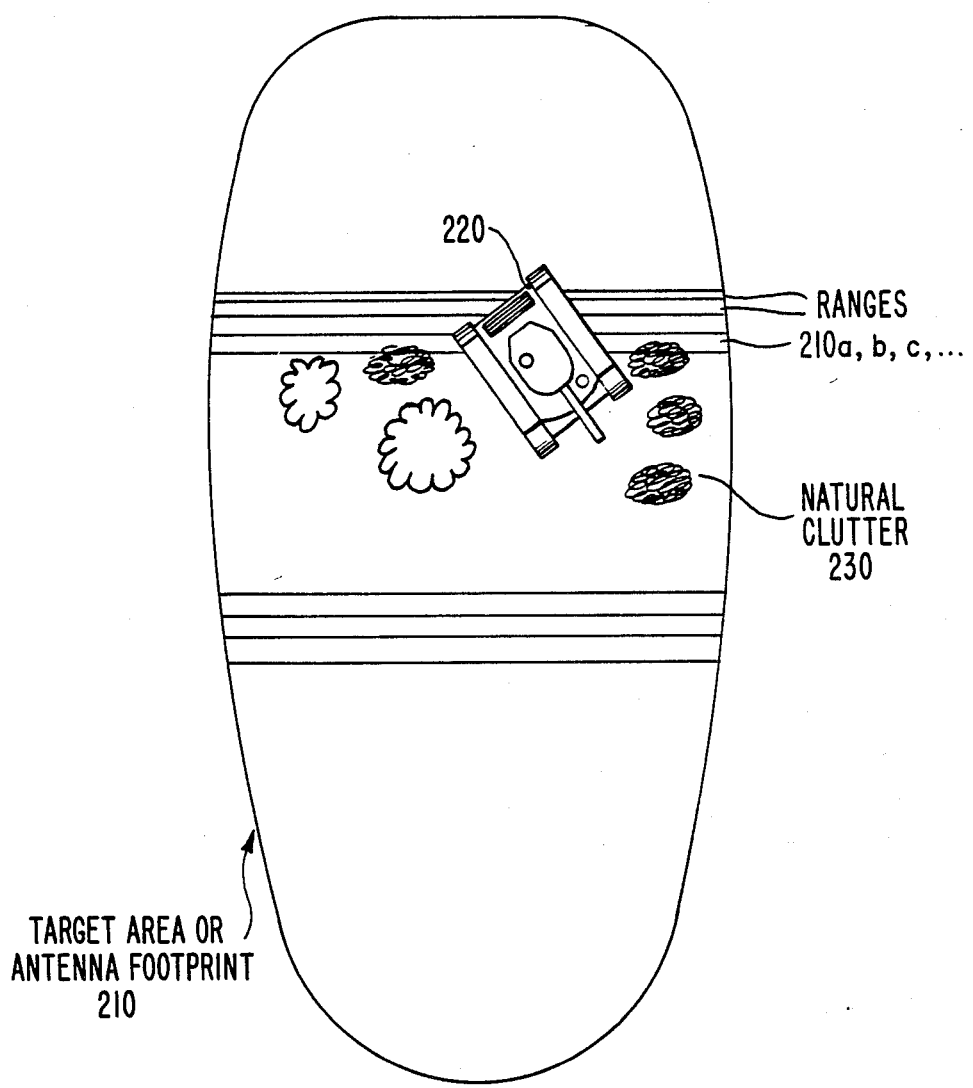
FIG. 3 shows an example of a target area, with ranges, for the preferred embodiment of the radar signal processor in FIG. 1.

Dual circularly polarized antenna 21, coupled to radar 20, directs a circularly polarized FM/CW signal to a target area. FIG. 3 contains an example of a target area 210. Target area 210 is an area of the ground viewed by a radar in a missile 200. Included in target area 210 is a target 220 and clutter 230. Target area 210 is also divided into a number of ranges 210a, 210b, etc., which are explained below in greater detail.

Antenna 21 also receives the reflections of the transmitted FM/CW signal from the target area. The received signals 110 are shown in FIG. 2 as delayed from the transmitted signal 100 by the round-trip signal transit time t1. Although the transmitted signal was polarized in only one direction, the reflections are polarized in both directions. The reason that the preferred embodiment of this invention uses polarized signals is because the desired targets for which this invention is likely to be used, for example armored vehicles, reflect almost equal amounts of left-circularly polarized and right-circularly polarized energy, thereby giving rise to certain advantages which are described in detail below. Polarized signals, however, are not required for use of this invention.

Antenna 21 sends the received reflections back to radar 20 which contains a mixer that mixes the received signals with samples of the transmitted signal to produce baseband frequency signals on two channels, one of which represents the right-circularly polarized reflections and one of which represents the left-circularly polarized reflections. Radar 20 generates the baseband signals when antenna 21, which is also conventional, is transmitting and receiving during the same sweep. The period of time t2 is also shown in FIG. 2.

It is also not necessary that radar 20 be coherent. A coherent radar is shown in FIG. 1 because that embodiment provides moving target detection. If moving target detection is not needed, then the radar need not be coherent.

In accordance with the present invention, the measuring means of the radar signal processor preferably includes means for analyzing the signals representing the signal power of the reflections and for generating signals representing successive power measurements from the different ranges of the target area. In the embodiment shown in FIG. 1, such an analyzing means is shown as Fourier Transform element 30, which is a Dual Channel Fast Fourier Transform (FFT) element.

Element 30 can have any number of standard designs since FFTs are widely used with FM/CW radars to determine the amount of energy in several "range gates." "Range gates" are radar processing constructs defining mathematical bins which each correspond to different "ranges" in a target area. Ranges 210a, b, c in FIG. 3 represent different distances or "ranges" from radar 200. In the preferred embodiment shown in FIG. 1, there are 512 range gates for each channel.

The analyzing means in FIG. 1 is an FFT since radar 20 is an FM/CW radar. If, for example, radar 20 were a pulsed radar, the analyzing means would be different. Together, radar 20 and FFT 30 produce a series of digital values for each channel which represent the magnitude and phase of the received radar power from each of the ranges. Magnitude and phase are defined by a pair of values I and Q. I represents the magnitude of the real component of the measured power and Q represents the magnitude of the imaginary component of the measured power. The total power amplitude is actually $(I^2+Q^2)$ and the phase is $\tan^{-1}(I/Q)$.

Figure 4A:
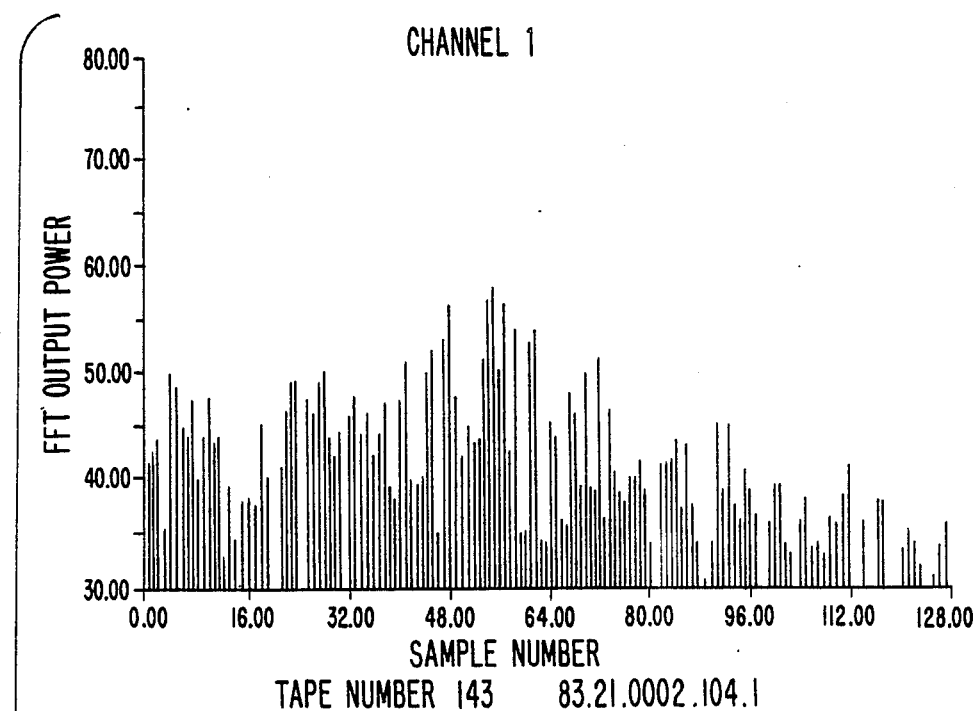
FIGS. 4a–4c show samples of data produced at various stages of the radar signal processor in FIG. 1.
Figure 4A:
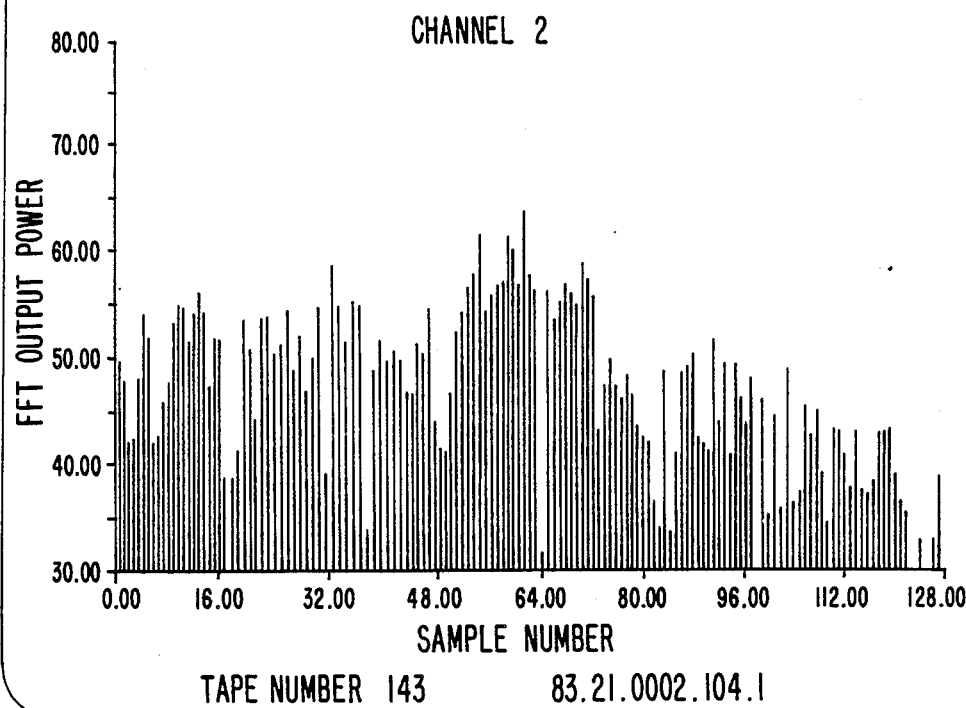

FIG. 4a shows an example of data produced in one sweep of radar 20 by element 30 in the radar system in FIG. 1. FIG. 4a is a bar chart showing power amplitude measurements for the range gates in the first and second channels of the radar processing system. Power amplitude is represented along the vertical axis and the range number is represented along the horizontal axis. In the present invention, the measuring means produces successive measurements of power for each range gate by processing successive radar sweeps.

In accordance with the present invention, there are means, coupled to the measuring means, for determining, for each range gate, the minima of a first number of successive power measurements in each channel. In the preferred embodiment shown in FIG. 1, the dual channel Minimum Amplitude Time History (MATH) processor 40 provides such means and the first number of power measurements is a preset number of FM sweeps to be processed.

Figure 5:
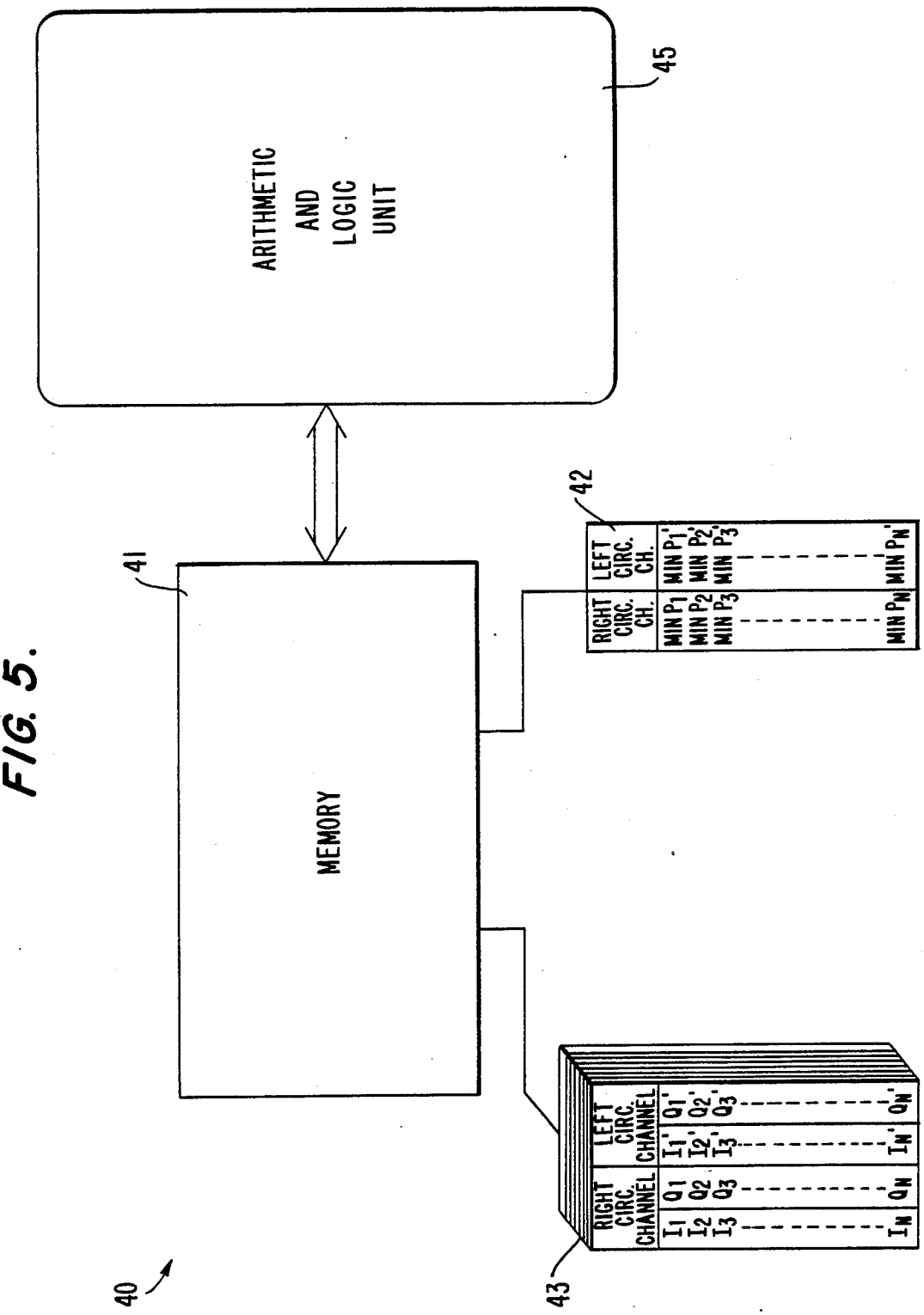
FIG. 5 is a block diagram of the minimum amplitude time history processor shown in FIG. 1.

FIG. 5 is a block diagram of the elements in MATH processor 40. Those elements include arithmetic and logic unit 45 and memory 41. Memory 41 serves as means for storing the successive power measurements for each range and each channel. In FIG. 5, memory 41's capacity is at least 2rn, where r is the number of range gates, n is the predetermined number of sweeps. The multiplier 2 reflects the fact that these are two channels. As FIG. 5 shows, the measured value for each range, channel, and sweep is stored in Table 43 as an I-Q pair denoted as I and Q or as I' and Q' where the subscript designates the corresponding sweep and range gate. The "'" distinguishes the two channels. To simplify the remaining discussion; the "'" will be omitted with the understanding that the described operations are the same for both channels.

Arithmetic and logic unit 45, which can be a microprocessor, controls the input and output of data for processor 40 and selects the minimum stored power measurement for each range gate of each channel. To make the selection, unit 45 first calculates the power, $P_{AB} = I_{AB}^2 + Q_{AB}^2$, for each channel, range gate B, and sweep A. Arithmetic and logic unit 45 then select $P_B$ as the minimum $P_{AB}$ for each range B of both channels.

Of course it is possible to form Table 42 without storing the values of $I_{AB}$ and $Q_{AB}$ in memory 41 if processor 45 is fast enough to determine the minimum power for each range in real time. For reasons explained in greater detail below, it is preferable to store all of the power measurements for certain other processing.

By the operation just described, MATH processor 40 takes advantage of the wide variation in power amplitudes of successive power measurements from ranges containing only clutter or noise. In ranges containing targets, the power amplitude fluctuation is relatively small over several sweeps and the minimum values of received power from ranges with targets differ only slightly from their maximum values. The minimum power values for ranges containing noise or clutter will be very small, due to the large fluctuation in power measurements.

Natural vegetative clutter will also produce a wide range of amplitude variation due to a process known as clutter decorrelation. Natural clutter is constantly in motion due to wind forces, and the radar signature which is presented to a radar will change very rapidly with time. The process of clutter decorrelation has been measured at nearly 100 milliseconds at millimeter wave frequencies. It is not necessary, however, to wait such a long period to determine that certain signals represent only reflections from clutter. The power amplitude of natural clutter will exhibit large variations in amplitude during just a few microseconds of sweeps.

Figure 4B:
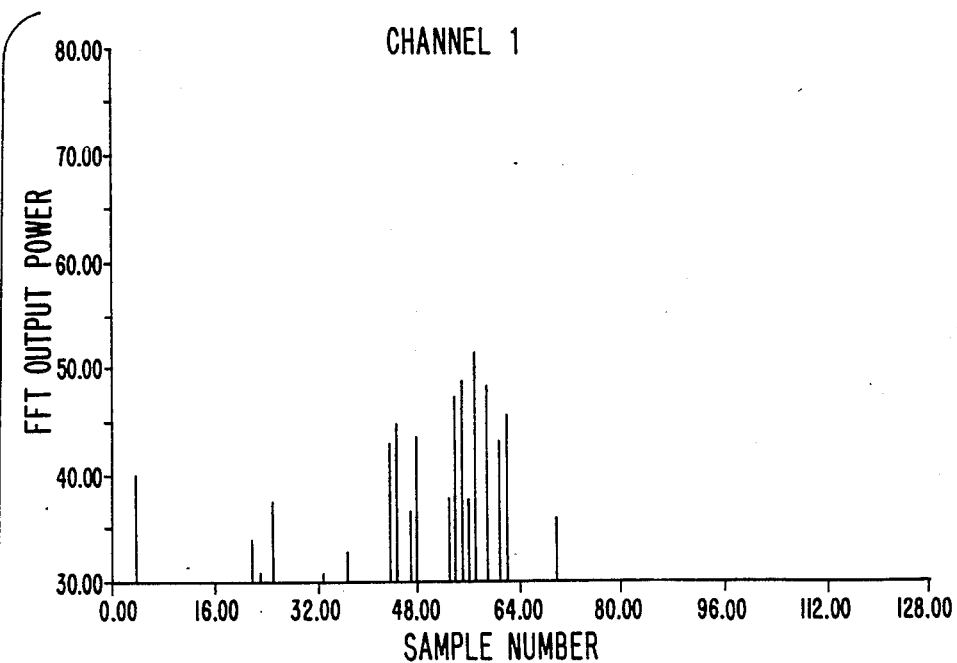
Figure 4B:
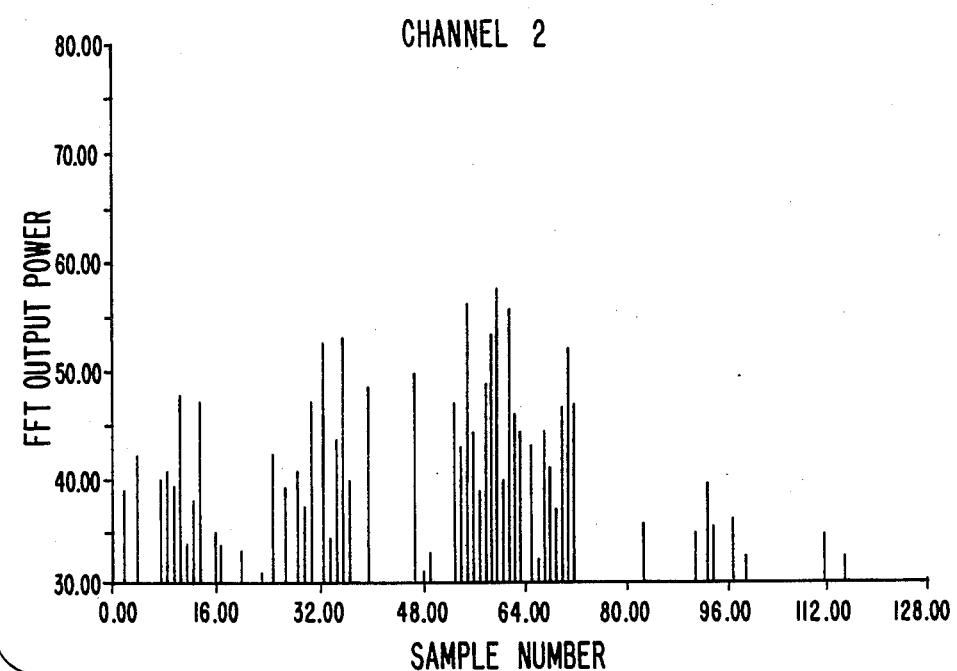

FIG. 4b shows the effect of MATH processor 40 on the data in FIG. 4a. For most of the range gates of the two channels, the minimum power value is either zero or a very small number indicating an absence of desired targets in the corresponding ranges. The data shown in FIG. 4b was obtained after only 1.5 milliseconds, which demonstrates the speed of this invention.

In accordance with the present invention, the radar signal processor also includes means for correlating the determined minimum values in the first and second channels for each range in order to locate targets in the target area. Preferably the correlating means also includes means for identifying which ranges of the target area have a high probability of containing a desired target. In the processor 10 in FIG. 1, such identifying means includes correlator 50 and target location determiner 60.

Correlator 50 compares the minimum power amplitudes of the first and second channels, for each range, to determine the correlation If either one of the channels has a zero or very small amplitude for a particular range, then the output of correlator 50 is a very small number or zero. If both channels have large amplitudes, then correlator 50 outputs a high number for that range indicating a high degree of correlation.

Figure 6:
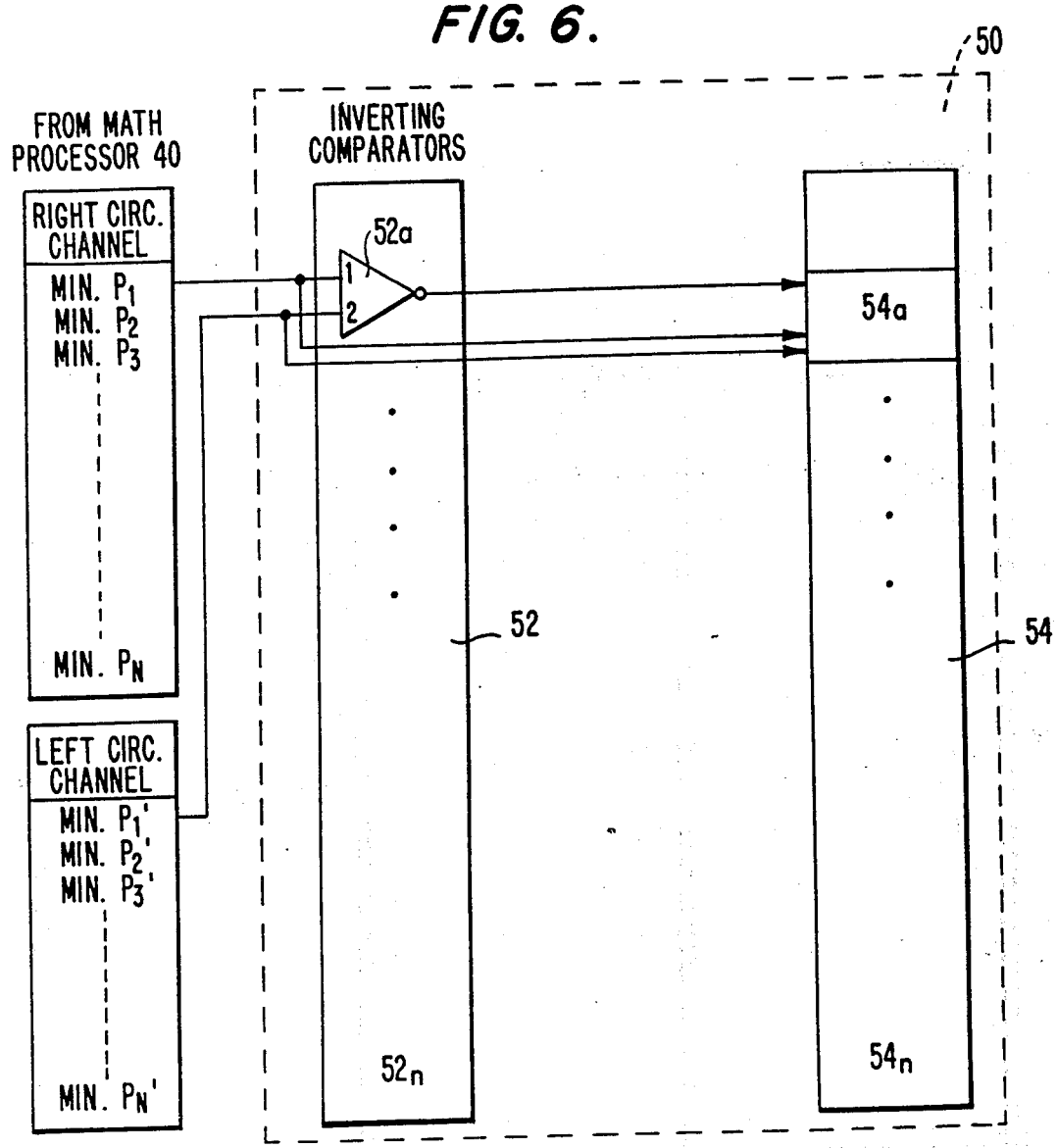

A preferred implementation of correlator 50 is shown in FIG. 6 as producing a value equal to the smaller of the amplitudes in the first and second channels of each range gate. Correlator 50 contains an operational amplifier 52a-52n comparator and a corresponding latch 54a-n for each range gate. For range gate a, the corresponding comparator 52a compares $P_1$ and $P'_1$, the minimum power values for each channel. The output of comparator 52a directs the smaller of $P_1$ and $P'_1$ to corresponding latch 54a for storage.

As indicated above, the reason for using circularly polarized signals in the preferred embodiment of this invention was that the most desired targets, like armored vehicles, reflect substantially equal amounts of right- and left-circularly polarized power. Thus, if a desired target is in a particular range, the received reflected power will be great in both channels. If, there is some other object in a range, the reflected power in one channel will be large and in the other channel the reflected power will be small. Ranges containing objects that are not desired targets will thus be weeded out by correlator 50.

Figure 4C:
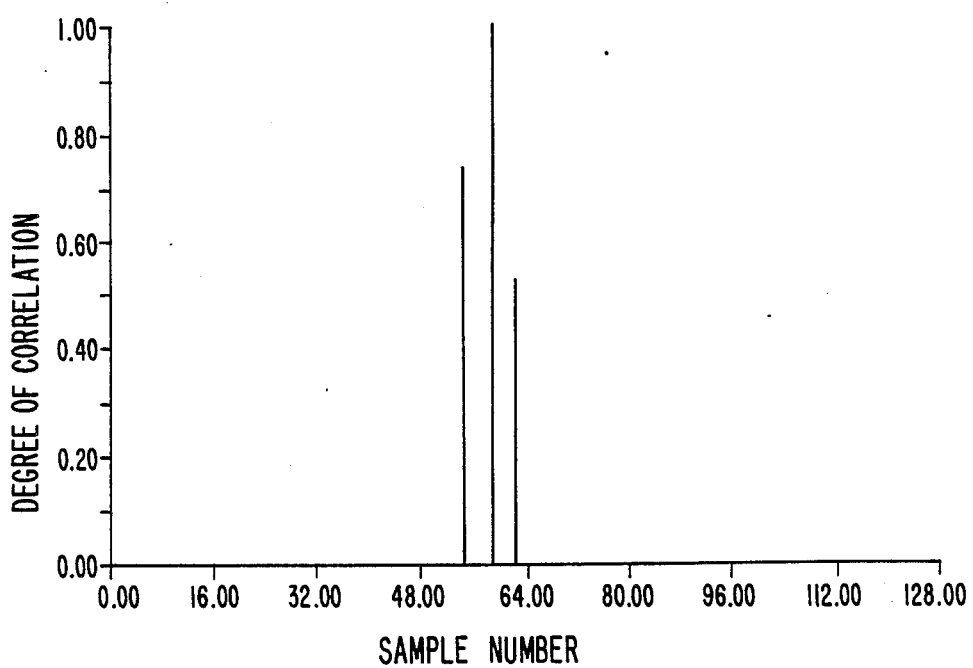

FIG. 4c shows the effect of correlator 50 on the data in FIG. 4b. FIG. 4c shows that there is a sufficiently high degree of "correlation" in only three ranges.

In FIG. 1, target location determiner 60 is coupled to the output of correlator 50 and determines for each range gate whether the output of correlator 50 exceeds a predetermined threshold. If it does, then the output of target location determiner 60 identifies the corresponding range as having a high probability of a desired target. Correlator 50 would produce a large value, i.e., one exceeding the predetermined threshold, only if the power amplitudes in the range gates of the first and second channels were both relatively large compared to the reduced amplitudes of the surrounding noise and clutter.

The signal processor of this invention may also include target recognition means for examining the power measurements for the ranges identified by the range identifying means. In FIG. 1, radar signal processor 10 includes target classifier 90 as a target recognition means. Target location determiner 60 informs target classifier 90 which ranges have high probabilities of containing targets. Armed with such information, target classifier 90 examines the time history information from MATH processor 40 only for those identified ranges.

Target classifier 90 is a conventional element which contains information about reflected power signature of desired targets. Classifier 90 compares that prestored information with the magnitude and phase data stored in MATH processor 40 for the identified ranges. If there is a high degree of correlation between the prestored information and the data in a selected range gate of MATH processor 40, then target classifier 90 determines that a particular target exists in the corresponding range and it identifies that target.

Although such classifiers are known, their use has been handicapped by the need to examine the radar signature for all the ranges. In the present invention, however, the classifier need only examine the radar signature in certain selected ranges, thus making the target classification and radar processing of this invention much faster.

Using this invention, it is possible to reduce the rate at which a target classification algorithm must operate. This benefit accrues as a result of analyzing several radar sweeps, or several sets of pulsed radar range gates, and producing a single set of target-enhanced data on which to operate. Since the next set of enhanced radar data is not available until another full set of data is acquired, this "dead time" is available for the target classification described above. The fact that enhanced data is provided to a target classification algorithm removes the need for a more complex algorithm, such as the ones described in the Background of the Invention, to handle less desirable data (i.e., data having a lower signal-to-noise or signal-to-clutter ratio).

The radar signal processor described above may also be adapted to determine the speed of moving targets in a manner which is both fast and accurate. Presently known methods and apparatus for determining moving target velocity involve the use of Fourier Transform Doppler Processors, but these methods and apparatus are slow because they must process all of the data in each of the range gates in a typical radar system. All that processing limits the system's effectiveness. With this invention, however, once certain ranges have been identified as likely locations for targets, Doppler Processing need only use the data in those corresponding range gates.

For moving target detection, the radar signal processor of this invention would include a means for calculating the velocity of targets in the identified ranges. In FIG. 1, such means includes Dual Channel Fourier Transform Doppler Processor 80. Such Doppler Processors are known to persons of ordinary skill in the art for determining velocities of detected objects. In FIG. 1, processor 80 is coupled to target location determiner 60 which contains information regarding which ranges are most likely to have targets. Processor 80, which is also coupled to MATH processor 40, only reads out the stored I&Q values for the range gates corresponding to ranges identified by target location determiner 60. Hence, the processing for target velocity in this invention takes a fraction of the time of conventional target velocity determination methods. The output of Doppler Processor 80 is also fed to classifier 90 to aid that classifier in target identification.

To improve the target velocity determination of this invention further, the radar signal processor of this invention may also include means for normalizing the magnitudes of the successive power measurements for at least one range according to the determined minimum of the measurements in that range while preserving the phase information of those power measurements. In the preferred embodiment shown in FIG. 1, such means includes amplitude limiter 70, which is shown in greater detail in Figure 7.

Limiter 70 reduces all of the power magnitudes $P_{AB}$ until they equal $P_B$, the minimum power value for each range B. The phase of each power measurement, which is determined from the ratio I/Q, is preserved by reducing the values for $I_{AB}$ and $Q_{AB}$ by the same factor.

Figure 7:
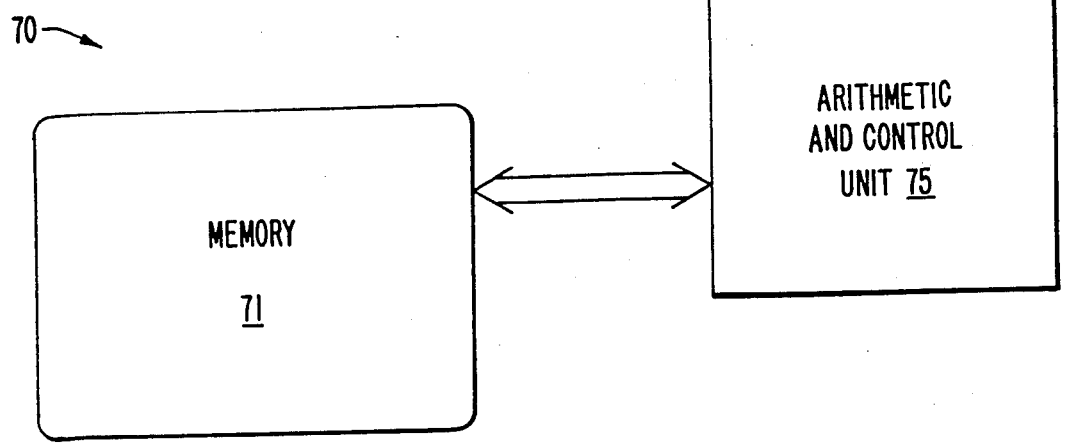
FIG. 7 is a block diagram of the amplitude limiter shown in the preferred embodiment of FIG. 1.

As FIG. 7 shows, amplitude limiter 70 includes a memory 71 which, like memory 41 of MATH processor 40, must contain at least 2rn storage locations. Limiter 70 also includes arithmetic and control unit 75 which supervises the transfer of data between limiter 70 and both MATH processor 40 and Doppler Processor 80, and which performs the mathematical operations for normalizing the power measurements. Control unit 75 can be a microprocessor.

Specifically, for each power measurement $I_{AB}$ and $Q_{AB}$ read out from MATH processor 40, unit 75 calculates a new pair $I_{ABLIM}$ and $Q_{ABLIM}$ as follows:

$$I_{ABLIM} = I_{AB}/10(10 \log P_{AB} - 10 \log P_B), \text{ and}$$

$$Q_{ABLIM} = Q_{AB}/10(10 \log P_{AB} - 10 \log P_B),$$

where, as defined earlier, $P_{AB}$ is the magnitude of power in range gate of sweep A and is equal to $I_{AB}^2 + Q_{AB}^2$.

$I_{ABLIM}$ and $Q_{ABLIM}$ are normalized values having the same phase as $I_{AB}$ and QAB. The phase preservation is fairly clear because $I_{AB}/Q_{AB} = I_{ABLIM}/Q_{ABLIM}$. Furthermore, since $I_{ABLIM}^2 + Q_{ABLIM}^2 = (I_{AB}^2 + Q_{AB}^2)/(P_{AB}/P_B) = P_B$.

Unit 75 fills memory 71 with normalized values for $I_{ABLIM}$ and $Q_{ABLIM}$. The reason for such normalization is that it is considerably more difficult to detect and quantify target motion using doppler processing if amplitude noise (i.e., amplitude variation) is present than if only phase variation exists. Since MATH processor 40 determines the minimum amplitude in the data gathered for each range gate, amplitude limiter 70 clamps every value in the range gate to that minimum value, thereby eliminating amplitude variation.

Doppler Processor 80 performs a Fourier Transform, which is in effect a spectrum analysis, at each range gate location in which there is determined to be a high probability of a desired target. The resulting spectrum from processor 80 at each gate location shows the frequency, or equivalently the target velocity, of any detected target. Processor 80 can also detect both positive and negative (receiving and approaching) motion.

The invention, as the described embodiment demonstrates, achieves all of its objectives. The radar signal processor apparatus and method of this invention is fast because only selected information is analyzed, and can be extremely accurate since noise and clutter are quickly reduced. Furthermore, none of the processing requires any knowledge of radar (i.e., missile) motion, so the radar signal processor can be airborne without being greatly affected by missile velocity. Furthermore, this radar signal processor can detect both stationary and moving targets, as explained above, and is very compatible with moving target recognition systems.

It will be apparent to those skilled in the art that modifications and variations can be made in the radar signal processing methods and apparatus of this invention. Some of those modifications and variations are suggested in the above description, but they should not be considered as limitations. The invention in its broader aspects is not limited to the specific details, representative methods and apparatus, and illustrative examples shown and described. Departure may be made from such details without departing from the spirit or scope of the general inventive concept.

What is claimed is:

1. A signal processor for a radar viewing a target area, said radar signal processor comprising:

means for measuring the radar power received from a plurality of ranges in said target area and for producing on first and second channels signals which represent successive measurements of said power from said ranges;

means coupled to said measuring means for determining for each said range the minimum of a first number of successive power measurements in each said channel; and means for correlating said determined minimum power measurements in said first and second channels for each said range in order to locate targets in said target area.

2. The signal processor of claim 1 wherein said measuring means includes means for transmitting radar power to said target area, for receiving reflections of said transmitted power from said target area, and for producing on said first and second channels signals representing the signal power of said reflections.

3. The radar signal processor of claim 1 wherein said measuring means includes an antenna and a coherent FM/CW dual channel radar coupled to said antenna.

4. The radar signal processor of claim 3 wherein said coherent radar includes means for generating circularly polarized transmission signals.

5. The signal processor of claim 2 wherein said measuring means also includes means for analyzing said signals representing the signal power of said reflections and for generating said signals representing successive power measurements from said different ranges of said target area.

6. The radar signal processor in claim 5 wherein said analyzing means includes a Dual Channel FFT processor.

7. The radar signal processor in claim 1 wherein said determining means includes first means for storing a first number of said successive measurements for each range and each channel, and means for selecting said minimum measurements from said measurements stored in said storing means.

8. The radar signal processor of claim 7 wherein said determining means includes second means for storing said determined minimum measurements.

9. The radar signal processor of claim 1 wherein said determining means includes a microprocessor.

10. The radar signal processor in claim 1 wherein said correlating means includes means for identifying which ranges of said target areas have a high probability of containing a desired target, and wherein said radar signal processor also includes target recognition means, coupled to said range identifying means and said determining means, for examining the power measurements for the ranges identified by said range identifying means to determine whether said identified ranges contain said desired target.

11. The radar signal processor in claim 1 further comprising means, coupled to said determining means and said correlating means, for calculating the velocities of targets in said target area.

12. The radar signal processor in claim 10 further including means coupled to said determining means and said range identifying means for calculating the velocity of targets in the ranges identified by said range identifying means.

13. The radar signal processor in claim 11 or 12 wherein said velocity calculating means includes a Fourier Transform doppler processor.

14. The radar signal processor in claim 11 or 12 further including means coupled between said determining means and said calculating means for normalizing the magnitudes of said first number of successive power measurements for at least one range according to the determined minimum of said measurements in said at least one range while preserving the phase information of said first number of power measurements.

15. The radar signal processor of claim 14 wherein said normalizing means includes a memory coupled to an arithmetic and control unit.

16. The radar signal processor in claim 14 wherein said measuring means includes means for measuring the real and imaginary components of said received radar power and wherein said normalizing means includes means for changing the magnitudes of said real and imaginary components of said power proportionately to maintain the ratio of said components.

17. A signal processor for a radar viewing a target area, said radar signal processor comprising:

a circularly polarized antenna focused toward said target area;

a coherent FM/CW dual channel radar coupled to said antenna for transmitting circularly polarized signals to said target area, for receiving reflections of said transmitted signals from said target area, said reflections being both rightcircularly polarized and left-circularly polarized, and for producing on first and second channels signals representing the power of said right-circularly polarized and left-circularly polarized reflections, respectively;

a dual channel FFT processor coupled to said radar for analyzing said signals from said first and second channels to produce successive power measurements for each of several ranges in said target area;

a minimum amplitude time history processor coupled to said dual channel FFT processor to determine, for each of said channels, the minimum of a first number of said successive power measurements for each said range;

a correlator, coupled to said minimum amplitude time history processor, for comparing the determined minimum power measurements in said first and second channels for each said range;

a target location determiner coupled to the output of said correlator for analyzing the results of the comparison by said correlator to identify certain ranges having a high probability of containing a desired target; and a target classifier coupled to said target location determiner determining the presence of desired targets in said ranges identified by said target location determiner.

18. A signal processor for examining a periodic radar-signal composed of a sequence of power measurements each taken during a different period of said radar signal to determine whether said sequence contains desired information, said processor comprising:

means for determining the minimum of said periodic sequence of power measurements; and means for comparing said determined minimum to a predetermined threshold to determine whether said sequence contains said desired information.

19. The signal processor of claim 18 wherein said radar signal contains two related periodic sequences of measurements, wherein said determining means includes means for determining the minimum of each of said periodic sequences, and wherein said comparing means includes means for comparing both said determined minima to each other and to said predetermined threshold.

20. A signal processor for a radar receiving radar power reflected from a target area of said radar, said radar signal processor comprising:
   means for successively measuring the magnitude and phase of said received power;
   means for storing a first plurality of said magnitude and phase measurements;
   means for determining the minimum of said stored measurements; and
   means for normalizing the magnitudes of said stored measurements according to said minimum stored measurement and for preserving the phase information of said measurements.

21. A method for radar signal processing comprising the steps of:
   measuring the power received from different ranges in a target area of a radar;
   producing on first and second channels signals from said measured power, said signals representing successive power measurements for said ranges;
   determining for each of said channels the minimum of a first number of successive power measurements for each range in said target area; and
   correlating the determined minimum power measurements in said first and second channels for each range in order to locate targets in said target area.

22. The method of claim 21, wherein said power measuring step includes the steps of
   transmitting radar power to said target area, and
   receiving reflections of said transmitted power from said target area; and
   wherein said signals producing step includes the step of
   producing on said first and second channels said signals representing the signal power of said reflections.

23. The method of claim 22 wherein said signals producing step also includes the steps of:
   analyzing said signals on said first and second channels representing the signal power of said reflections, and
   generating signal components for each of said signals representing said power measurements for each of said ranges of said target area; and
   wherein said minimum power measurement determine steps includes the step of determining, for each of said ranges, the minimum of said signal components representing that range.

24. The method of claim 21 wherein said process also includes the steps of:
   identifying which ranges of said target areas have a high probability of containing a desired target; and
   examining said power measurements for said ranges identified as having a high probability of containing a desired target to determine whether such ranges do contain said desired target.

25. The method of claim 21 further including the steps of calculating the velocity of targets in said target area.

26. The method of claim 25 further including the step of normalizing the amplitudes of said first number of successive power measurements for at least one range according to the determined minimum of said measurements in said at least one range while preserving the phase information.

* * * * *